US008237645B2

(12) United States Patent
Hsueh et al.

(10) Patent No.: US 8,237,645 B2
(45) Date of Patent: Aug. 7, 2012

(54) APPARATUS FOR DRIVING PANEL IN DISPLAY SYSTEM

(75) Inventors: Han-Shui Hsueh, Tainan County (TW); Chih-Wei Chen, Tainan County (TW)

(73) Assignee: Himax Technologies Limited, Tainan County (TW)

(*) Notice: Subject to any disclaimer, the term of this patent is extended or adjusted under 35 U.S.C. 154(b) by 1025 days.

(21) Appl. No.: 11/838,815

(22) Filed: Aug. 14, 2007

(65) Prior Publication Data

US 2009/0046080 A1 Feb. 19, 2009

(51) Int. Cl.
*G09G 3/36* (2006.01)
*G09G 5/00* (2006.01)
*G06F 3/038* (2006.01)

(52) U.S. Cl. .......................................... 345/92; 345/204

(58) Field of Classification Search .................... 345/66, 345/87–104, 204–215, 690–699; 713/300–340
See application file for complete search history.

(56) References Cited

U.S. PATENT DOCUMENTS 5,793,346 A * 8/1998 Moon ............................ 345/92
5,874,828 A * 2/1999 Lee ............................... 323/274
6,064,360 A * 5/2000 Sakaedani et al. .............. 345/92
6,512,334 B2 * 1/2003 Kao et al. ................... 315/169.1
7,109,965 B1 * 9/2006 Lee et al. ......................... 345/98
7,679,595 B2 * 3/2010 Luo et al. ......................... 345/98
8,040,309 B2 * 10/2011 Hung et al. ..................... 345/92
2002/0041279 A1 4/2002 Chou
2002/0080133 A1 * 6/2002 Eu ................................. 345/212
2003/0189564 A1 * 10/2003 Lee et al. ...................... 345/212
2005/0001825 A1 1/2005 Huang
2005/0099376 A1 * 5/2005 Shih et al. ........................ 345/98
2006/0022971 A1 * 2/2006 Luo et al. ...................... 345/211
2007/0176866 A1 * 8/2007 Hung et al. ...................... 345/87

FOREIGN PATENT DOCUMENTS

TW 554322 9/2003
TW 594662 6/2004

* cited by examiner

*Primary Examiner* — Alexander Eisen
*Assistant Examiner* — Patrick F Marinelli

(57) ABSTRACT

An apparatus for driving a panel in a display system includes a reset device, a gate driver and a pull-high circuit. The reset device asserts a control signal when the display system is powered off. The gate driver has an input terminal receiving the control signal and turns on all rows of pixels on the panel when the control signal is asserted. The pull-high circuit includes a resistor and a switch, in which the resistor has a first end coupled to the input terminal, and the switch decouples a second end of the resistor from a first reference voltage when the display system is powered off.

6 Claims, 2 Drawing Sheets

APPARATUS FOR DRIVING PANEL IN DISPLAY SYSTEM

BACKGROUND

1. Field of Invention

The present invention relates to an apparatus for driving a panel in a display system. More particularly, the present invention relates to an apparatus for driving a panel in a thin-film-transistor liquid crystal display (TFT-LCD) system.

2. Description of Related Art

In a TFT-LCD system, there is usually a reset device detecting a supply voltage for the LCD system and asserting a control signal, i.e. XAO signal, transmitted to a gate driver of the LCD system. When the LCD system is powered off, the supply voltage decreases, and the reset device asserts the XAO signal, such that the outputs of the gate driver are all at a high level, and all rows of pixels on the panel are thus turned on to be discharged.

FIG. 1 shows a gate driver receiving the control signal. The gate driver 100 has an input terminal 106 for receiving the control signal, i.e. XAO signal, and includes a resistor 102 and an electrostatic discharge (ESD) protection device 104. One end of the resistor 102 is coupled to the supply voltage VDD, and the other end of the resistor 102 is coupled electrically to the input terminal 106. The ESD protection device 104 is coupled between the input terminal 106 and the resistor 102.

During a normal operation of the LCD system, the resistor 102 keeps the XAO signal at a high level. When the LCD system is powered off, the supply voltage VDD decreases, and the reset device (not shown) asserts the XAO signal by an open-drain MOSFET (not shown). However, when the supply voltage VDD continues to decrease, the turn-on resistance of the open-drain MOSFET increases gradually, so that the XAO signal cannot be kept at a low level indeed; that is, the XAO signal would be affected by the resistor 102 to increases gradually. Therefore, the outputs of the gate driver cannot be kept at a high level to turn on the pixels on the panel.

SUMMARY

In accordance with one embodiment of the present invention, an apparatus for driving a panel in a display system is provided. The apparatus includes a reset device, a gate driver and a pull-high circuit. The reset device asserts a control signal when the display system is powered off. The gate driver has an input terminal receiving the control signal and turns on all rows of pixels on the panel when the control signal is asserted. The pull-high circuit includes a resistor and a switch, in which the resistor has a first end coupled to the input terminal, and the switch decouples a second end of the resistor from a first reference voltage when the display system is powered off.

For the foregoing embodiment of the present invention, the apparatus can be used to make sure that the control signal, received by the gate driver, can be kept at a low level when the display system is powered off. The outputs of the gate driver can be therefore all be kept at a high level to turn on the pixels on the panel to clear the residual charges, preventing the retained images.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
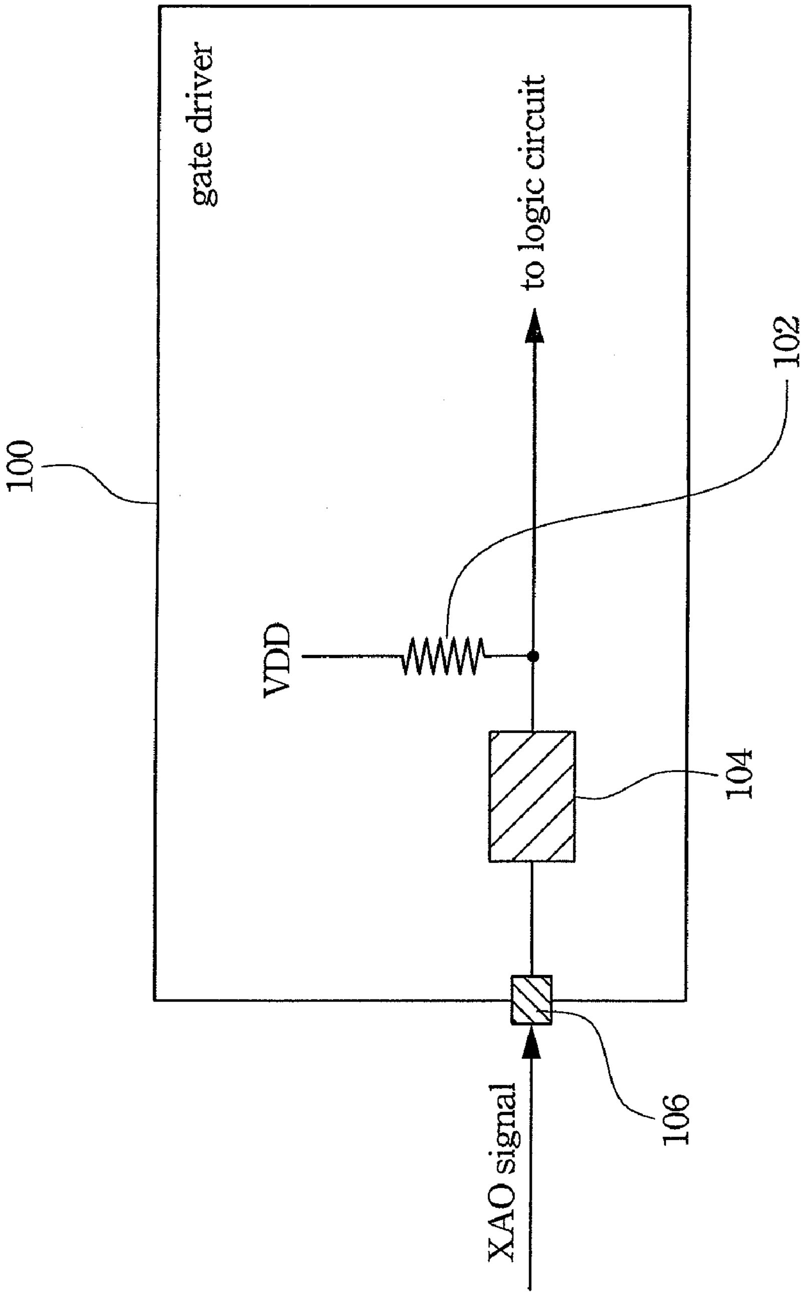
Fig. 1 (PRIOR ART)
FIG. 1 shows a gate driver receiving the control signal.
Figure 2:
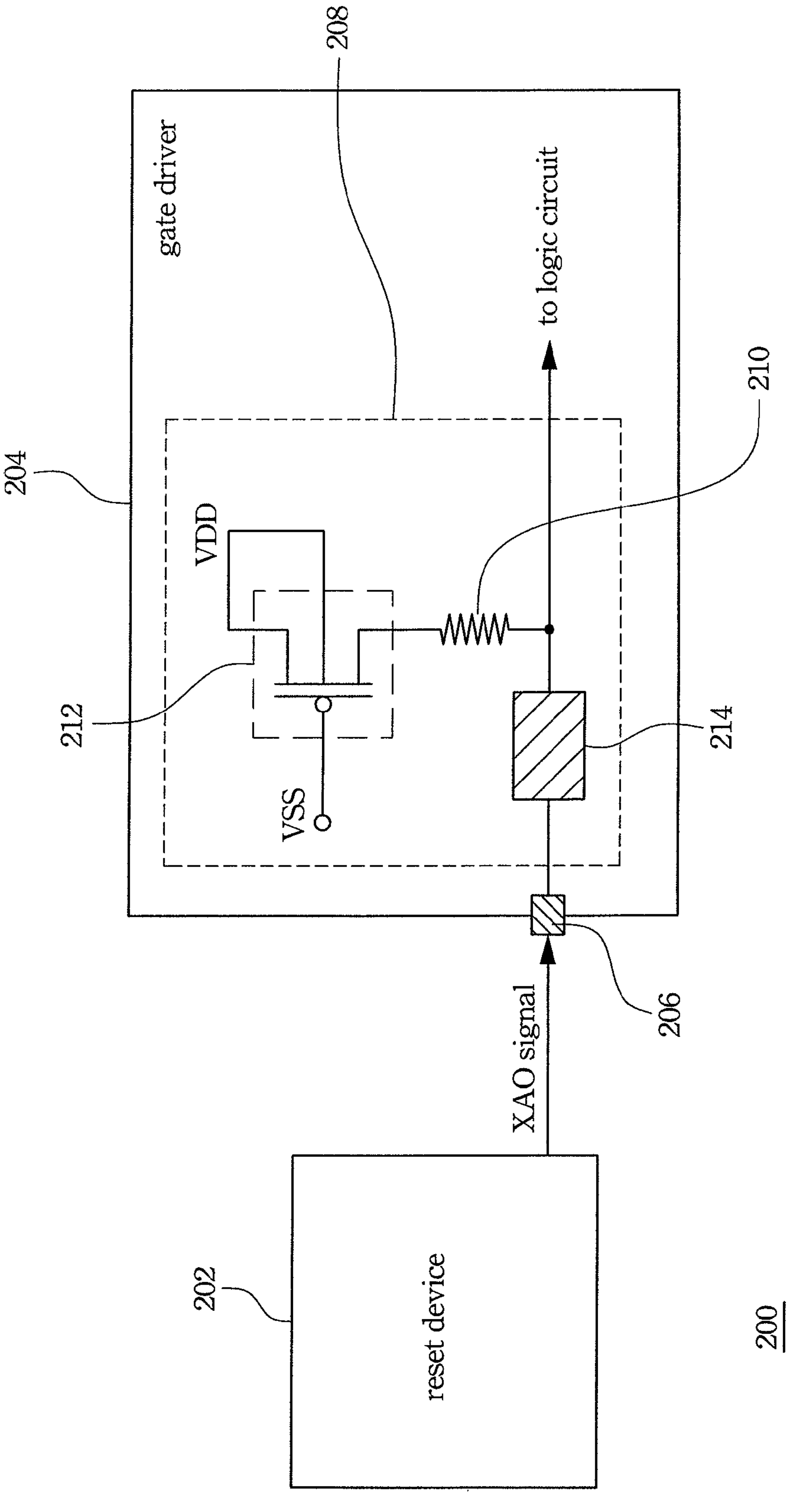
FIG. 2 shows an apparatus for driving a panel in a liquid crystal display system according to one embodiment of the present invention.

FIG. 2 shows an apparatus for driving a panel in a liquid crystal display system according to one embodiment of the present invention. The apparatus 200 includes a reset device 202, a gate driver 204 and a pull-high circuit 208, in which the pull-high circuit 208 is located in the gate driver 204. Alternatively, the pull-high circuit 208 may be located outside the gate driver 204. The reset device 202, such as a reset IC, is coupled to the gate driver 204 and asserts a control signal, i.e. XAO signal, when the LCD system is powered off. The gate driver 204 has an input terminal 206 receiving the control signal, i.e. XAO signal, asserted by the reset device 202. The pull-high circuit 208 includes a resistor 210, a switch 212 and an electrostatic discharge (ESD) protection device 214. The resistor 210 has a first end coupled electrically to the input terminal 206. The switch 212 is coupled to a first reference voltage VDD, a second reference voltage VSS and a second end of the resistor 210, in which the first reference voltage VDD and the second reference voltage VSS are a supply voltage and a ground voltage of the LCD system, respectively. The ESD protection device 214 is coupled between the input terminal 206 and the resistor 210.

The switch 212 can further be a p-type metal-oxide-semiconductor field effect transistor (MOSFET). The gate of the transistor is connected to the ground voltage VSS, and the first source/drain of the transistor is connected to the supply voltage VDD, and the second source/drain of the transistor is connected to the second end of the resistor 210.

During the normal operation of the LCD system, the supply voltage VDD is higher than a predetermined threshold, so that the switch 212 is turned on and couples the second end of the resistor 210 to the supply voltage VDD accordingly, and the XAO signal is kept at a high level by the resistor 210 as well. When the LCD system is powered off, the supply voltage VDD decreases, so that the switch 212 accordingly decouples the second end of the resistor 210 from the supply voltage VDD if the supply voltage VDD decreases below the predetermined threshold, and the XAO signal would be free from being affected by the resistor 210. Furthermore, when the supply voltage VDD decreases below the predetermined threshold, the reset device 202 asserts the control signal, i.e. XAO signal, in which the XAO signal is kept at a low level at the moment. Subsequently, the gate driver 204 is enabled by the XAO signal such that the outputs of the gate driver 204 are all kept at a high level to turn on all rows of the pixels on the panel, so as to clear the residual charges.

For the foregoing embodiments of the present invention, the apparatus can be used to make sure that the control signal, received by the gate driver, can be kept at a low level when the display system is powered off. The outputs of the gate driver can therefore be all kept at a high level to turn on the pixels on the panel to clear the residual charges, to prevent the retained images.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An apparatus for driving a panel in a display system, the apparatus comprising:

a reset device for asserting a control signal when the display system is powered off;

a gate driver having an input terminal for receiving the control signal and turning on all rows of pixels on the panel when the control signal is asserted; and a pull-high circuit comprising:

a resistor having a first end coupled to the input terminal; and a switch having a turned-on state in which the switch couples a second end of the resistor to a supply voltage when the display system is powered on, and a turned-off state in which the switch decouples the second end of the resistor from the supply voltage when the display system is powered off, wherein the switch is a transistor having a gate connected to a ground voltage, a first source/drain connected to the supply voltage, and a second source/drain connected to the second end of the resistor.

2. The apparatus as claimed in claim 1, wherein the switch is configured to be in the turned-on state to couple the second end of the resistor to the supply voltage during a normal operation of the display system.

3. The apparatus as claimed in claim 1, wherein the transistor is a p-type metal-oxide-semiconductor field effect transistor.

4. The apparatus as claimed in claim 1, wherein the supply voltage and the ground voltage are a supply voltage and a ground voltage of the display system, respectively, and the supply voltage is configured to decrease when the display system is powered off.

5. The apparatus as claimed in claim 4, wherein the reset device is configured to assert the control signal when the supply voltage decreases below a predetermined threshold.

6. The apparatus as claimed in claim 1, wherein the pull-high circuit is located in the gate driver.

* * * * *